(12) United States Patent
Das et al.

(10) Patent No.: US 8,493,877 B1
(45) Date of Patent: Jul. 23, 2013

(54) ADAPTIVE SATELLITE RETURN LINK SYMBOL RATE DETERMINATION

(75) Inventors: Aniruddha Das, Carlsbad, CA (US); Bruce Collins, San Diego, CA (US)

(73) Assignee: ViaSat, Inc., Carlsbad, CA (US)

( * ) Notice: Subject to any disclaimer, the term of this patent is extended or adjusted under 35 U.S.C. 154(b) by 372 days.

(21) Appl. No.: 12/833,917

(22) Filed: Jul. 9, 2010

Related U.S. Application Data

(60) Provisional application No. 61/224,444, filed on Jul. 9, 2009.

(51) Int. Cl.
*H04W 52/18* (2009.01)
*H04W 52/20* (2009.01)
*H04W 52/30* (2009.01)

(52) U.S. Cl.
USPC .................. 370/252; 375/296; 375/297

(58) Field of Classification Search
CPC ....... H04W 52/20; H04W 52/30; H04W 52/18; H04W 52/365
USPC ............. 370/249, 229, 230, 232, 241, 252; 375/295, 296, 297
See application file for complete search history.

(56) References Cited

U.S. PATENT DOCUMENTS 5,949,861 A * 9/1999 Chan et al. ............... 379/100.17
7,468,972 B2 * 12/2008 Walsh et al. .................. 370/348
2004/0240578 A1 * 12/2004 Thesling ...................... 375/285
2006/0161680 A1 * 7/2006 Balsevich ...................... 709/245
2007/0263711 A1 * 11/2007 Theodor Kramer et al. . 375/222

OTHER PUBLICATIONS

Ue, T.; Sampei, S.; Morinaga, N.; , "Symbol rate and modulation level controlled adaptive modulation/TDMA/TDD for personal communication systems," Vehicular Technology Conference, 1995 IEEE 45th , vol. 1, no., pp. 306-310 vol. 1, Jul. 25-28, 1995.*
Das, A.; Miller, M.J.; , "Remote non-linearity detection via burst power dithering and EM based SNR Estimation," Satellite and Space Communications, 2007. IWSSC '07. International Workshop on , vol., no., pp. 216-220, Sep. 13-14, 2007.*

* cited by examiner

*Primary Examiner* — Ayaz Sheikh
*Assistant Examiner* — Tarell Hampton
(74) *Attorney, Agent, or Firm* — Kilpatrick Townsend & Stockton LLP

(57) ABSTRACT

A method for determining a maximum symbol rate of a return communication link includes: assigning transmission opportunities at a current symbol rate equal to a first symbol rate to the user terminal; receiving a plurality of messages during the assigned transmission opportunities at the current symbol rate from the user terminal; first determining if a number of messages incorrectly received is less than a threshold number of incorrect messages and second determining if a power amplifier of the user terminal is operating in a linear region; if the number of messages incorrectly received is less than the threshold number and if the power amplifier is operating in the linear region, assigning a channel at the current symbol rate to the user terminal as a home channel for the user terminal; and otherwise, repeating at an updated current symbol rate.

16 Claims, 6 Drawing Sheets

Typical $P_{in}$ vs. $P_{out}$ curve of a solid state power amplifier of a user terminal Exemplary channel configurations showing a group of return link channels (Return Channel Group (RCG)) of various symbol rates from 20Msps to 625ksps and showing a frequency-dependent gain at the User Terminal

ADAPTIVE SATELLITE RETURN LINK SYMBOL RATE DETERMINATION

CROSS REFERENCES TO RELATED APPLICATIONS

The present application claims benefit of priority under 35 U.S.C. 119(e) of U.S. Provisional Application No. 61/224,444, filed on Jul. 9, 2009, entitled "ADAPTIVE SATELLITE RETURN LINK SYMBOL RATE DETERMINATION," the entirety of which is herein incorporated by reference for all purposes.

FIELD OF THE INVENTION

The present invention relates generally to satellite communications systems. More particularly, the present invention relates to methods and apparatuses for adaptively determining return link symbol rate in satellite communications systems.

BACKGROUND

The next generation of commercial high capacity $K_a$ frequency band (i.e., 26.5-40 GHz) satellite-based broadband systems promise high data rates for the end user at a low cost. These systems typically use multiple gateway terminals to communicate with a large number of user terminals, with the satellite between the gateway terminal and the user terminals. A forward link of a satellite communications system may consist of forward uplink transmissions from a gateway terminal to a satellite, a "bent pipe" repeater at the satellite, and forward downlink transmissions to a group of user terminals located in a common spot beam. A return link of a satellite communications system may consist of return uplink transmissions from user terminals in a common spot beam to a satellite, and return downlink transmissions from the satellite to a gateway terminal servicing the spot beam.

One example of a satellite system is a Time Division Multiple Access (TDMA) system, where each user shares the same channel but uses different timeslots. A variation on a TDMA system is a Multi-Frequency TDMA (MF-TDMA) system, where each user could be made to hop across different frequency channels on a burst-by-burst basis. In some implementations of an MF-TDMA or a TDMA system, a return link scheduler at the gateway terminal can allocate different non-overlapping timeslots to different users.

With increasing customer demand for higher upload speeds on the return link, these satellite systems typically employ multiple channels, each at different symbol rates (e.g., 20 Msps, 10 Msps, 5 Msps, etc.) on the return link. For the same Forward Error Correction (FEC) encoding on all the return link channels, higher symbol rates result in higher end user speeds. Thus, for example, with quadrature phase-shift keying (QPSK) modulation and an FEC code rate of ½, a user of a 20 Msps return link channel would be able to achieve 20 Mbps upload speeds, while a user of a 5 Msps return link channel would only be able to achieve 5 Mbps upload speeds with the same modulation and code rate.

Thus, it is desirable from a user experience point of view to have the user terminals communicate to the gateway terminal on a return link channel at the highest possible symbol rate. The highest symbol rate at which a particular user terminal may be capable of operating can depend on the particular user terminal. This dependency might be due to a variety of factors, such as amplifier wattage, position in the spot beam, weather conditions, pointing accuracy, the class of service obtained, etc. Typically, if other factors (e.g., FEC and modulation) remain constant, higher symbol rates require higher transmit power to achieve the same error performance achieved with lower transmit power at lower symbol rates.

In conventional systems, an appropriate symbol rate is chosen for each user terminal in a non-adaptive, hard-coded fashion (e.g., hard-coded in a factory-installed configuration file in the user terminal) or by trial and error. Typically, there is no mechanism for adaptively determining the maximum symbol rate of the return link for a particular user terminal.

SUMMARY

An example of a method for determining a maximum symbol rate of a return communication link from a user terminal to a satellite, according to the disclosure includes: assigning transmission opportunities at a current symbol rate to the user terminal, the current symbol rate equal to a first symbol rate; receiving a plurality of messages during the assigned transmission opportunities at the current symbol rate from the user terminal; first determining if a number of the plurality of messages incorrectly received is less than a threshold number of incorrect messages and second determining if a power amplifier of the user terminal is operating in a linear region; if the number of the plurality of messages first determined to be incorrectly received is less than the threshold number of incorrect messages and if the power amplifier is second determined to be operating in the linear region, assigning a channel at the current symbol rate to the user terminal as a home channel for the user terminal; and if the number of the plurality of messages first determined to be incorrectly received is greater than or equal to the threshold number of incorrect messages or if the power amplifier is second determined to be operating in a compression region, repeating the transmission opportunities assigning, receiving, and first determining at an updated current symbol rate equal to a second symbol rate.

Embodiments of such a method may include one or more of the following features. The first symbol rate is equal to a maximum symbol rate for the return communication link. The first symbol rate is equal to an intermediate symbol rate that is lower than a maximum symbol rate for the return communication link. The method further includes if the number of the plurality of messages first determined to be incorrectly received is greater than or equal to the threshold number of incorrect messages and if not all messages of the plurality of messages are third determined to be incorrectly received, repeating the receiving and first determining at the current symbol rate until a number of a latest plurality of messages first determined to be incorrectly received is less than the threshold number of incorrect messages or a number of instances of the receiving and first determining at the current symbol rate is fourth determined to be equal to a maximum number of instances. The method further includes: if the number of the plurality of messages first determined to be incorrectly received is greater than or equal to the threshold number of incorrect messages and if all messages of the plurality of messages are third determined to be incorrectly received, fourth determining if the current symbol rate is equal to a minimum symbol rate for the return communication link; if the current symbol rate is fourth determined to be equal to the minimum symbol rate, repeating the receiving and first determining at the current symbol rate until a number of a latest plurality of messages first determined to be incorrectly received is less than the threshold number of incorrect messages or a number of instances of the receiving and first determining at the current symbol rate is fifth determined to be equal to a maximum number of instances; and if the current symbol rate is fourth determined to be unequal to the minimum symbol rate, repeating the transmission opportunities assigning, receiving, and first determining at the updated current symbol rate equal to the second symbol rate that is lower than the first symbol rate.

Repeating includes repeating the transmission opportunities assigning, receiving, and determining at updated current symbol rates that are increasingly lower for each consecutive iteration. Repeating includes: repeating until both a number of the plurality of messages of a latest iteration first determined to be incorrectly received is less than the threshold number of incorrect messages and the power amplifier is second determined to be operating in the linear region for the updated current symbol rate of the latest iteration; and assigning a channel at the updated current symbol rate of the latest iteration to the user terminal as a home channel for the user terminal. Repeating includes repeating until the power amplifier is second determined to be operating in the compression region for the latest iteration and the updated current symbol rate of the latest iteration is third determined to be equal to a minimum symbol rate for the return communication link. The method further includes repeating the transmission opportunities assigning, receiving, and first determining at an updated current symbol rate equal to a third symbol rate that is higher than the second symbol rate.

An example of a system for determining a maximum symbol rate of a return communication link in a satellite communications system includes: a plurality of user terminals; a satellite communicatively coupled to the plurality of user terminals; and a gateway communicatively coupled to the satellite and configured to: assign transmission opportunities at a current symbol rate to a user terminal of the plurality of user terminals, the current symbol rate equal to a first symbol rate; receive a plurality of messages during the assigned transmission opportunities at the current symbol rate from the user terminal; first determine if a number of the plurality of messages incorrectly received is less than a threshold number of incorrect messages and second determine if a power amplifier of the user terminal is operating in a linear region; if the number of the plurality of messages first determined to be incorrectly received is less than the threshold number of incorrect messages and if the power amplifier is second determined to be operating in the linear region, assign a channel at the current symbol rate to the user terminal as a home channel for the user terminal; and if the number of the plurality of messages first determined to be incorrectly received is greater than or equal to the threshold number of incorrect messages or if the power amplifier is second determined to be operating in a compression region, repeat the transmission opportunities assigning, receiving, and first determining at an updated current symbol rate equal to a second symbol rate.

Embodiments of such a system may include one or more of the following features. The first symbol rate is equal to a maximum symbol rate for the return communication link. The first symbol rate is equal to an intermediate symbol rate that is lower than a maximum symbol rate for the return communication link. The gateway is further configured to, if the number of the plurality of messages first determined to be incorrectly received is greater than or equal to the threshold number of incorrect messages and if not all messages of the plurality of messages are third determined to be incorrectly received, repeat the receiving and first determining at the current symbol rate until a number of a latest plurality of messages first determined to be incorrectly received is less than the threshold number of incorrect messages or a number of instances of the receiving and first determining at the current symbol rate is fourth determined to be equal to a maximum number of instances. The e gateway is further configured to: if the number of the plurality of messages first determined to be incorrectly received is greater than or equal to the threshold number of incorrect messages and if all messages of the plurality of messages are third determined to be incorrectly received, fourth determine if the current symbol rate is equal to a minimum symbol rate for the return communication link; if the current symbol rate is fourth determined to be equal to the minimum symbol rate, repeat the receiving and first determining at the current symbol rate until a number of a latest plurality of messages first determined to be incorrectly received is less than the threshold number of incorrect messages or a number of instances of the receiving and first determining at the current symbol rate is fifth determined to be equal to a maximum number of instances; and if the current symbol rate is fourth determined to be unequal to the minimum symbol rate, repeat the transmission opportunities assigning, receiving, and first determining at the updated current symbol rate equal to the second symbol rate that is lower than the first symbol rate.

The gateway is further configured to repeat the transmission opportunities assigning, receiving, and determining at updated current symbol rates that are increasingly lower for each consecutive iteration. The gateway is further configured to: repeat the transmission opportunities assigning, receiving, and determining until both a number of the plurality of messages of a latest iteration first determined to be incorrectly received is less than the threshold number of incorrect messages and the power amplifier is second determined to be operating in the linear region for the updated current symbol rate of the latest iteration; and assign a channel at the updated current symbol rate of the latest iteration to the user terminal as a home channel for the user terminal. The gateway is further configured to repeat the transmission opportunities assigning, receiving, and determining until the power amplifier is second determined to be operating in the compression region for the latest iteration and the updated current symbol rate of the latest iteration is third determined to be equal to a minimum symbol rate for the return communication link. The gateway is further configured to repeat the transmission opportunities assigning, receiving, and first determining at an updated current symbol rate equal to a third symbol rate that is higher than the second symbol rate.

An example of a system for adaptively determining a maximum symbol rate for a transmitter transmitting on a return link in a communications system includes: a plurality of transmitters; and at least one receiver communicatively coupled to the plurality of transmitters and configured to: receive a plurality of messages transmitted at a current symbol rate from a transmitter of the plurality of transmitters; measure one or more parameters using the received plurality of messages; determine if the transmitter is operable at the current symbol rate based on the one or more measured parameters; if the transmitter is determined to be operable at the current symbol rate, transmit an indication to the transmitter that the current symbol rate is acceptable; and if the transmitter is determined not to be operable at the current symbol rate, receive additional messages at current symbol rates equal to progressively lower symbol rates until the transmitter is determined to be operable at the current symbol rate or the current symbol rate equals a minimum symbol rate for the system.

Embodiments of such a system may include one or more of the following features. The communications system is a satellite communications system; the transmitters are user terminals; each of the at least one receiver is a gateway; and the system further comprises a satellite communicatively coupled to the plurality of transmitters and the at least one gateway. The at least one receiver is further configured to transmit a request to the transmitter to transmit the additional messages if the transmitter is determined not to be operable at the current symbol rate. The received additional messages are transmitted by the transmitter after a time delay if the transmitter does not receive an indication from the receiver that the current symbol rate is acceptable. The received plurality of messages is transmitted during transmission opportunities assigned to the transmitter by the receiver. The received plurality of messages is transmitted by contention access.

Numerous benefits are achieved using the present invention over conventional techniques. User experience can be improved when a user terminal communicates to a gateway on a return channel at the highest symbol rate of which the user terminal is capable, while ensuring that the user terminal power amplifier operates in the linear region. The adaptive maximum symbol rate determination process can adaptively move the user terminals to higher return link symbol rates after fade events. These and other benefits are described throughout the specification and more particularly below.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same reference label irrespective of the second reference label.

DETAILED DESCRIPTION

The present invention provides improved methods and apparatuses for adaptively determining maximum symbol rate of a return communication link from a user terminal to a satellite. Transmission opportunities is assigned at a current symbol rate to the user terminal, where the current symbol rate is equal to a first symbol rate. Multiple messages are received during the assigned transmission opportunities at the current symbol rate from the user terminal. It is first determined if a number of the multiple messages incorrectly received is less than a threshold number of incorrect messages. It is second determined if a power amplifier of the user terminal is operating in a linear region. If the number of the multiple messages first determined to be incorrectly received is less than the threshold number of incorrect messages and if the power amplifier is second determined to be operating in the linear region, a channel is assigned at the current symbol rate to the user terminal as a home channel for the user terminal. Otherwise, the process repeats the transmission opportunities assigning, the receiving, and the first determining at an updated current symbol rate equal to a second symbol rate. These and other embodiments of the present invention are described more fully below.

Figure 1:
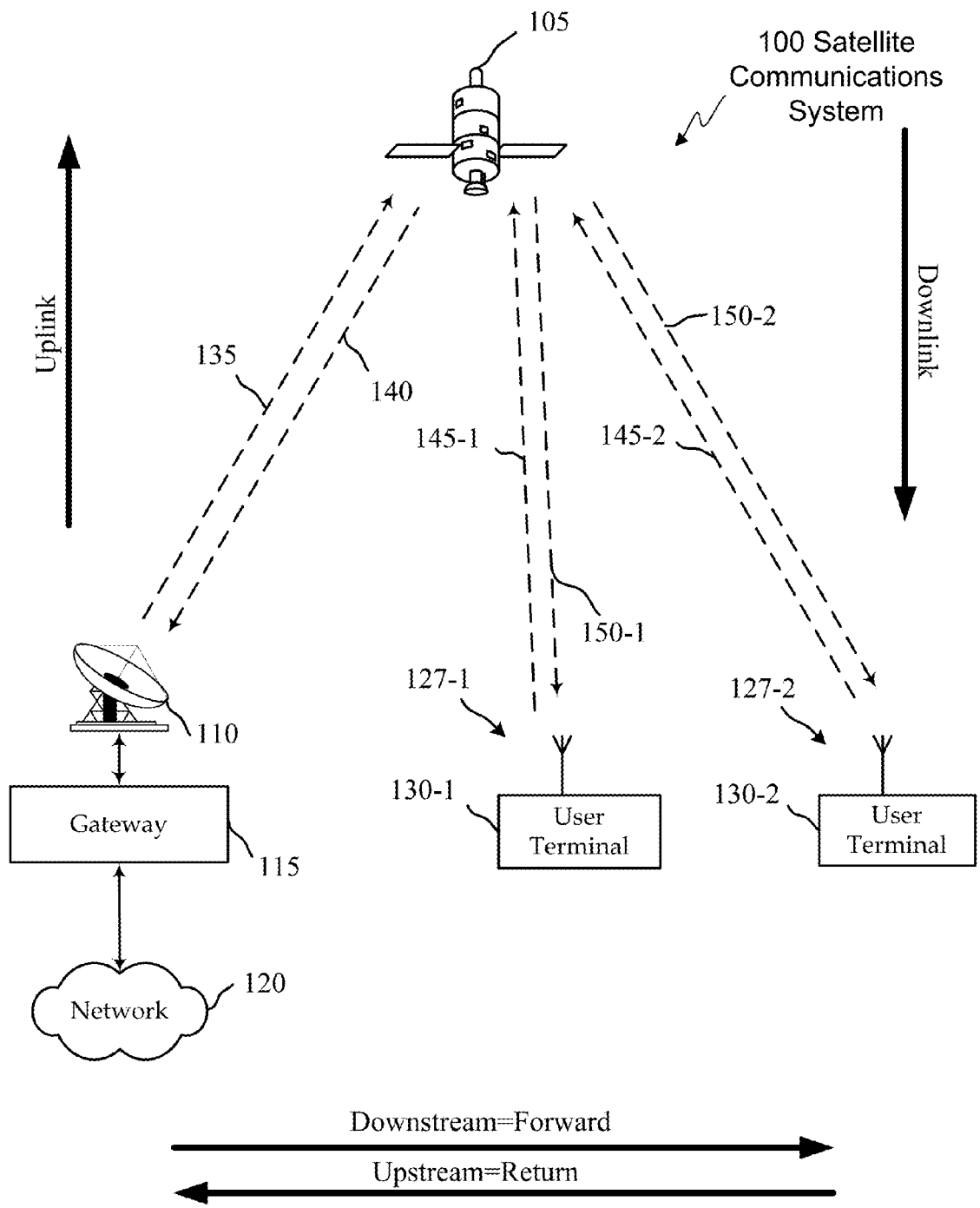
FIG. 1 is a simplified diagram of an exemplary satellite communications system in which the methods and apparatuses of the present invention may be used.

FIG. 1 is a simplified diagram of an exemplary satellite communications system 100 in which the methods of the present invention may be implemented. Satellite communications system 100 includes a network 120 interfaced with one or more gateway terminals 115. The gateway terminal 115 is configured to communicate with one or more user terminals 130 via a satellite 105.

The gateway terminal 115 is sometimes referred to as a hub or ground station. The gateway terminal 115 services uplink 135 and downlink 140 to and from the satellite 105. The gateway terminal 115 may also schedule traffic to the user terminals 130. Alternatively, the scheduling may be performed in other parts of the satellite communications system 100 (e.g., at one or more network operations centers (NOC) and/or gateway command centers). Although only one gateway terminal 115 is shown in FIG. 1, embodiments of the present invention may be implemented in satellite communications systems having a plurality of gateway terminals each of which may be coupled to one or more networks.

In some satellite communications systems, there may be a limited amount of frequency spectrum available for transmission. Communication links between the gateway terminal 115 and the satellite 105 may use the same, overlapping, or different frequencies as communication links between the satellite 105 and the user terminals 130. The gateway terminal 115 may be located remote from the user terminals 130 to enable frequency re-use.

The network 120 may be any type of network and can include, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. The network 120 may include both wired and wireless connections as well as optical links. The network 120 may connect the gateway terminal 115 with other gateway terminals that may be in communication with the satellite 105 or with other satellites.

The gateway terminal 115 provides an interface between the network 120 and the satellite 105. The gateway terminal 115 may be configured to receive data and information directed to one or more user terminals 130. The gateway terminal 115 may format the data and information for delivery to the respective user terminals 130. Similarly, the gateway terminal 115 may be configured to receive signals from the satellite 105 (e.g., from one or more user terminals 130) directed to a destination accessible via the network 120. The gateway terminal 115 may format the received signals for transmission on the network 120.

The gateway terminal 115 may use an antenna 110 to transmit a forward uplink signal 135 to the satellite 105. In one embodiment, the antenna 110 may comprise a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, low noise, and the like.

The satellite 105 may be a geostationary satellite that is configured to receive the forward uplink signals 135 from the location of the antenna 110. The satellite 105 may use, for example, a reflector antenna, a lens antenna, a phased array antenna, an active antenna, or any other mechanism known in the art for reception of such signals. The satellite 105 may process the signals received from the gateway terminal 115 and forward the downlink signals 150 to one or more of the user terminals 130. The signals may be passed through a transmit reflector antenna (e.g., a phased array antenna) to form the transmission radiation pattern (spot beam). The satellite 105 may operate in a multiple spot-beam mode, transmitting a number of narrow beams each directed at a different region of the earth. This allows segregation of the user terminals 130 into the various narrow beams.

The satellite 105 may be configured as a "bent pipe" satellite. In this configuration, the satellite 105 may perform frequency and polarization conversion of the received carrier signals before re-transmission of the signals to their destination. A spot beam may use a single carrier, i.e., one frequency, or a contiguous frequency range per beam. A variety of physical layer transmission modulation and coding techniques may be used by the satellite 105 (e.g., adaptive coding and modulation).

The satellite communications system 100 may use a number of network architectures consisting of space and ground segments. The space segment may include one or more satellites while the ground segment may include one or more user terminals, gateway terminals, network operations centers (NOCs), and satellite and gateway terminal command centers. The segments may be connected via a mesh network, a star network, or the like as would be evident to those skilled in the art.

The forward downlink signals 150 may be transmitted from the satellite 105 to one or more user terminals 130. The user terminals 130 may receive the downlink signals 150 using an antenna 127. In one embodiment, the antenna 127 and the user terminal 130 together comprise a very small aperture terminal (VSAT), with the antenna 127 measuring approximately 0.6 meters in diameter and having approximately 2 watts of power. In other embodiments, a variety of other types of antennas 127 may be used at the user terminals 130 to receive the downlink signals 150 from the satellite 105. Each of the user terminals 130 may comprise a single user terminal or, alternatively, may comprise a hub or router (not pictured) that is coupled to multiple user terminals. Each user terminal 130 may be connected to various consumer premises equipment (CPE) comprising, for example, computers, local area networks, internet appliances, wireless networks, and the like.

In a manner similar to that described above, the user terminals 130 may use return link transmissions to communicate with the gateway terminal 115 or the network 120 via the satellite 105. The return link may consist of return uplink transmissions 145 from the user terminals 130 to the satellite 105, and return downlink transmissions 140 from the satellite 105 to the gateway terminal 115. The gateway terminal 115 may format the received signals for transmission to one or more destinations that are accessible via the network 120.

The techniques described below for adaptive determination of maximum symbol rate on a return link can be applied to satellite communications systems such as the satellite communications system 100 of FIG. 1. Application of these techniques can make use of some protocols that are typically present in TDMA satellite systems. Some of these protocols are described briefly below.

Power Control and Ranging

A power control and ranging protocol can use a "Periodic Management Message" (PMM) that is transmitted periodically by each user terminal to the gateway. The PMM message protocol needs a return link scheduler at the gateway to grant or allocate an appropriate amount of time for each user terminal to transmit a PMM periodically. These grants from the return link scheduler at the gateway are known as "Periodic Management Grants" (PMG). In some implementations, the return link scheduler at the gateway also, or in the alternative, grants or allocates an appropriate frequency (i.e., for a channel for MF-TDMA systems) or code (e.g., for a Code Division Multiple Access (CDMA) system) for each user terminal to transmit a PMM periodically. These assignments can be considered transmission opportunities.

The PMM messages transmitted periodically by the user terminals are used by the gateway for power control and non-linearity avoidance (NLA), which are both requirements in a TDMA satellite system. On one hand, the gateway needs to instruct the user terminal to increase its transmit power to a level that is appropriate for quasi-error free reception. On the other hand, the transmit power cannot be so high that the power amplifier of the user terminal is operating in the saturation region, assuming non-constant envelope modulation is used, or that the user terminal is causing interference or violating off-axis transmission regulatory limits imposed by the FCC.

Figure 2:
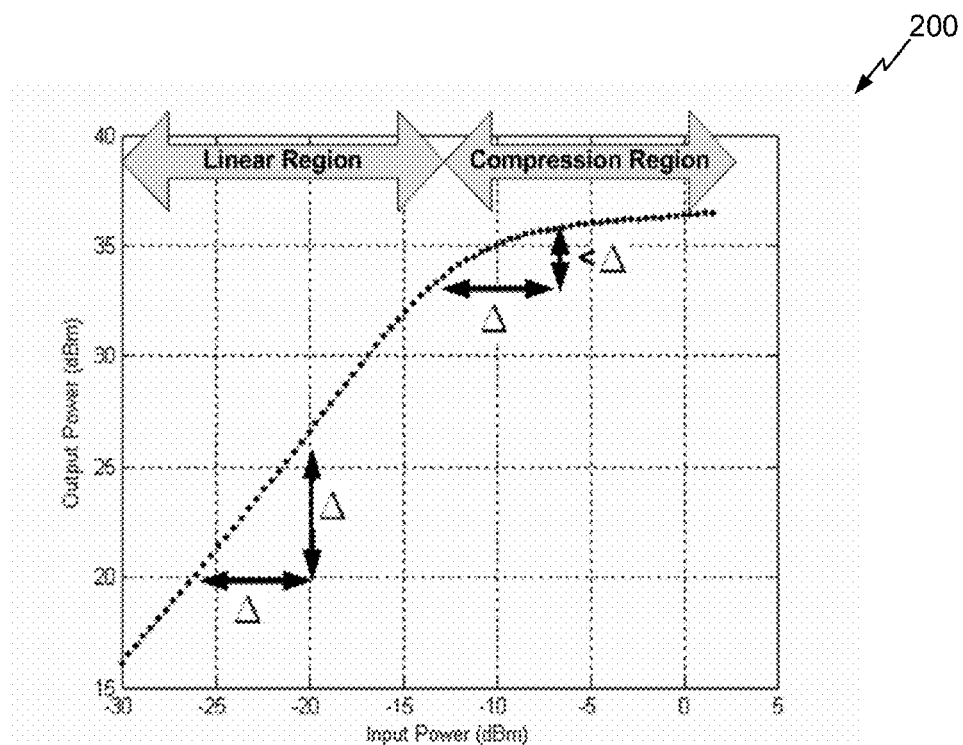
FIG. 2 shows a typical curve of input power versus output power of a solid state power amplifier of a user terminal 130 of FIG. 1.

FIG. 2 shows a typical curve 200 of input power versus output power of a solid state power amplifier (SSPA) of a user terminal 130 of FIG. 1. As illustrated in FIG. 2, the power amplifier operates in a linear region for lower input powers. However, at higher input powers, the power amplifier operates in a compression region (i.e., a saturation region). NLA techniques can be used to detect and/or avoid operation in the saturation region. Many techniques exist for power control and NLA. For example, one NLA technique is described in A. Das and M. Miller, "Remote non-linearity detection via burst power dithering and EM based SNR Estimation," International Workshop on Satellite and Space Communications, pp. 216-220, September 2007. The techniques disclosed below for adaptive determination of maximum symbol rate on a return link are not dependent on the specifics of particular techniques of power control or NLA used. Thus, details of power control and NLA techniques are not included in this disclosure.

Return Link Description Broadcast

Typically, when a user terminal is logging in to the satellite system, the user terminal will be able to lock to the forward link, and there will be sufficient information broadcast on the forward link for the user terminal to determine the configuration of the return link. That is, the user terminal should be able to determine autonomously what channels are being used on the return link, what the center frequencies are of the channels, what the symbol rates are of the channels, etc. This return link description information is typically broadcast on the forward link via a "Return Channel Group Descriptor" (RCGD) message. The details of this protocol are not included in this disclosure.

Return Link MAP Messages

In typical TDMA of MF-TDMA satellite systems, the return link scheduler in the gateway (e.g., in a Media Access Control layer (MAC) subsystem and/or a physical layer (PHY) subsystem) is responsible for assigning transmission opportunities (e.g., timeslots, frequencies, etc.) to all the user terminals in a non-overlapping fashion. This assignment of transmission opportunities is notified to the user terminals so that the various user terminals can transmit on their assigned transmission opportunities and only their assigned transmission opportunities. This notification can be in the form of a VS_RL_MAP message sent on the forward link. Thus, the VS_RL_MAP message is decoded by all user terminals, notifying each user terminal when that user terminal can transmit.

In some implementations, some or all of the transmission opportunities can be set aside for contention access. In contention access, various user terminals can simultaneously transmit, thus contending, and potentially colliding, for access to the channel. The use of return link MAP messages, assigned transmission opportunities, and contention transmission opportunities are well known in the field. The details of this protocol are not included in this disclosure.

Overview of Initial Ranging and Adaptive Maximum Symbol Rate Determination

As part of initial ranging, a user terminal (e.g., one of the user terminals 130 of FIG. 1) shall attempt to log in on the lowest symbol rate of the system. This ensures that the user terminal has the highest link margin available to close the link with the gateway. Depending on whether there is a last known good value for transmit power or whether the user terminal is logging in ab initio, the user terminal might have to increase gradually its transmit power or the size of its random backoff window before the log in is successful and the user terminal eventually hears back from the gateway. This initial logging process is typically done via contention access. The gateway participates in a ranging process by which the user terminal acquires power, timing, and frequency synchronization on a channel with the lowest symbol rate.

For adaptive determination of maximum symbol rate on the return link, after the initial ranging step, the gateway schedules the user terminal to transmit on higher symbol rates. The gateway control loops keep track of whether the user terminal can close the link at the higher symbol rates without saturating the amplifier of the user terminal. If the user terminal closes the link at the higher symbol rates without saturating the amplifier, the gateway allows the user terminal to send data traffic at this high symbol rate. However, if the user terminal fails to close the link or if the amplifier enters the saturation region, the gateway moves the user terminal to lower symbol rates, and an independent determination is made at each symbol rate as to whether the current symbol rate is appropriate for that user terminal. If the user terminal cannot close the link at the highest symbol rate in the system, it is possible that the user terminal tried to log in during a fade event. In that case, in some implementations, the system periodically tests whether the user terminal can be moved to the higher symbol rate.

It is possible, in some scenarios, for a particular user terminal to be able to close the link at a high symbol rate (e.g., 20 Msps) that exceeds a class of service that the user of the user terminal is authorized to use, for example, because the user only paid for a lower class of service (e.g., 10 Msps). In this case, in some implementations, the adaptive maximum symbol rate determination protocol takes, as input, the particular class of service associated with the particular user terminal. For example, the adaptive maximum symbol rate determination protocol can restrict the maximum symbol rate attempted by the particular user terminal to a maximum symbol rate allowed for the class of service associated with the user terminal.

Messaging Protocol for Adaptive Maximum Symbol Rate Determination

Figure 4:
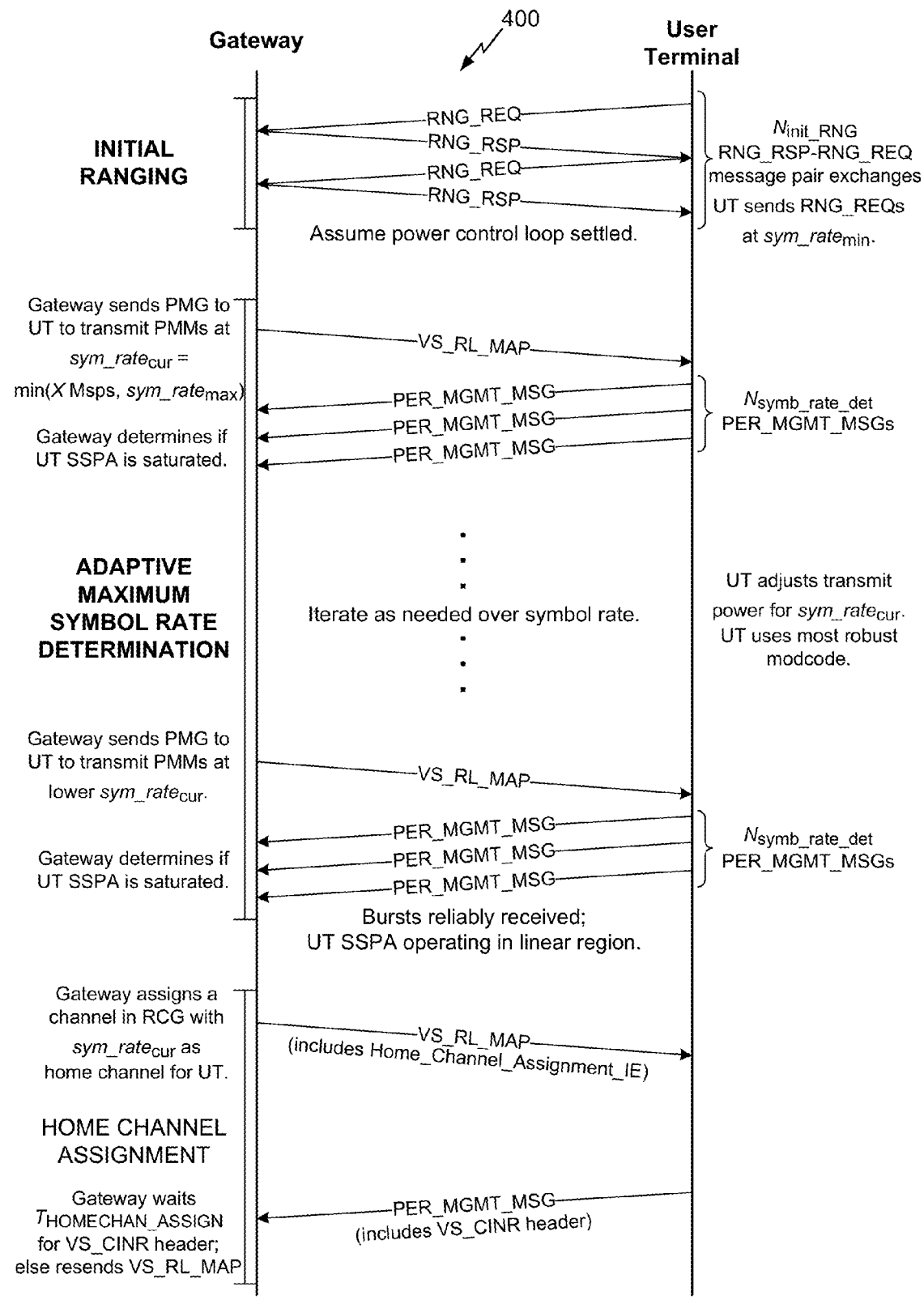
FIG. 4 shows an example messaging protocol for adaptively determining maximum symbol rate of a return link of the satellite communications system 100 of FIG. 1.
Figure 5:
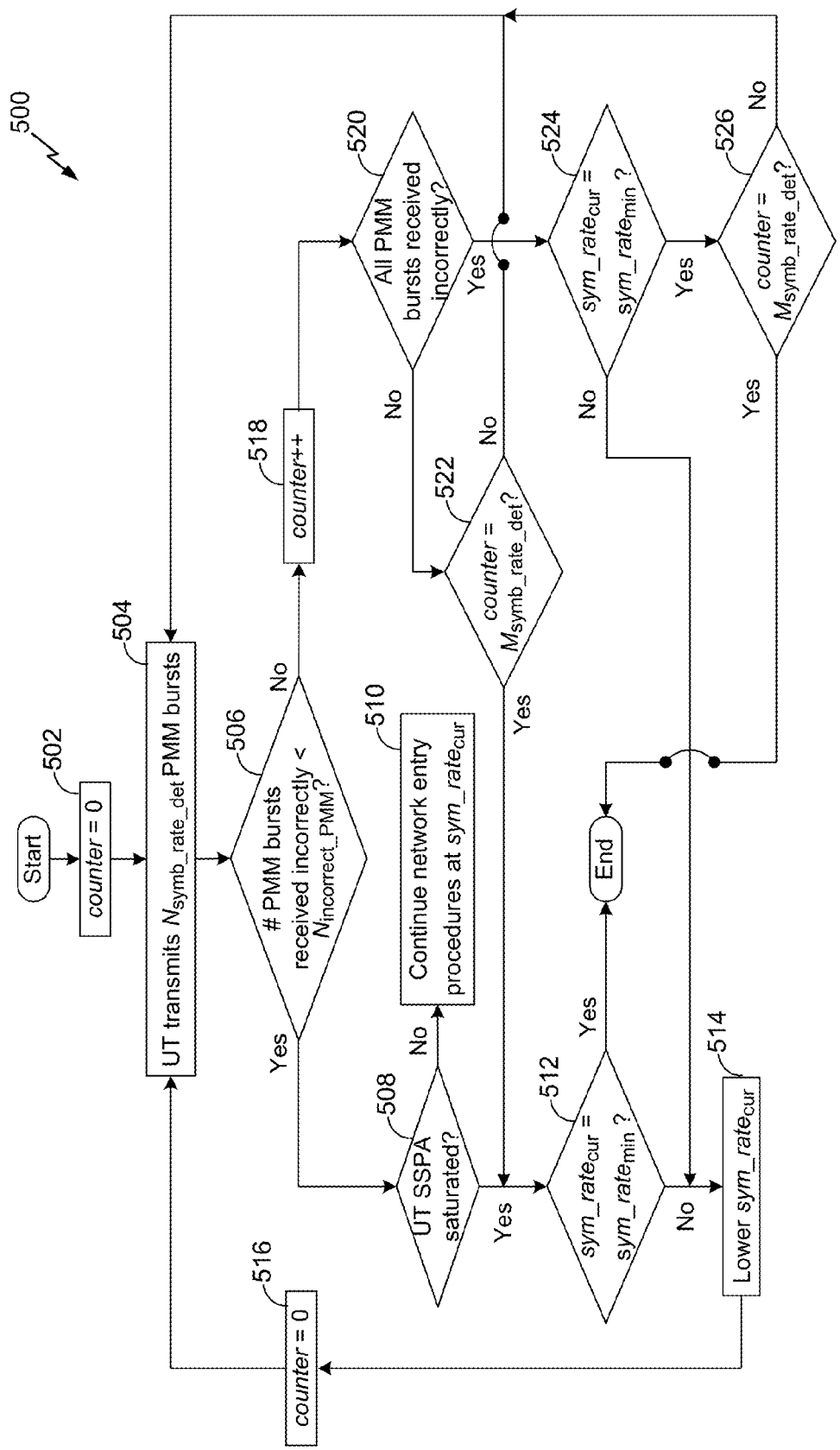
FIG. 5 provides a flow diagram describing methods of adaptively determining maximum symbol rate of a return link of the satellite communications system 100 of FIG. 1.

Referring to FIG. 4, with further reference to FIG. 5, an example messaging protocol 400 for adaptively determining maximum symbol rate of a return link of a satellite communications system is shown. The messaging of FIG. 4 is between a user terminal (e.g., one of the user terminals 130 of FIG. 1) and a gateway (e.g., the gateway terminal 115 of FIG. 1).

After the initial synchronization protocol has ensured that the user terminal trying to log in has acquired power, timing, and frequency synchronization on a channel with the lowest symbol rate (e.g., 625 ksps), the gateway facilitates the movement of this user terminal to another channel at a higher symbol rate. It is important in this process to ensure that the user terminal can transmit reliably on this higher symbol rate channel without saturating the SSPA of the user terminal. After the user terminal has been moved to a more appropriate symbol rate through this adaptive maximum symbol rate determination protocol, the rest of the network entry procedures (e.g., authentication) will take place at this higher symbol rate.

The completion of the initial ranging process is indicated by the completion of $N_{init\_RNG}$ range response and range request (i.e., RNG_RSP-RNG_REQ) message pair exchanges, as shown in FIG. 4. In some implementations, the first range request (i.e., RNG_REQ) sent from the user terminal is sent via contention access. The following range requests can be sent from the user terminal after receiving notice of assigned transmission opportunities from the gateway. For example, the assignment of these transmission opportunities can be notified to the user terminal using VS_RL_MAP messages sent on the forward link.

It is typical and presumed that the power control loop will have ample time to settle to the correct value in the lowest symbol rate (i.e., $sym\_rate_{min}$) channel at the end of these $N_{init\_RNG}$ message pair exchanges. In some implementations, the system (e.g., the user terminal and/or the gateway) will adaptively try to determine when the power control loop has settled instead of relying on a fixed number of $N_{init\_RNG}$ message pair exchanges. As an example, settling of the power control loop can be determined by checking a loop error parameter over a suitable time interval.

After the initial ranging process has completed, the gateway (e.g., the MAC/PHY processing subsystem) can assign transmit opportunities to the user terminal, e.g., via PMGs, to transmit at a current symbol rate (i.e., $sym\_rate_{cur}$) equal to the minimum of a predetermined symbol rate (i.e., X Msps) and the highest symbol rate in the system (i.e., $sym\_rate_{max}$). That is, the user terminal can be notified to transmit at $sym\_rate_{cur}=\min(X\ Msps, sym\_rate_{max})$, where X is a parameter set by the system. This is shown in FIG. 4. The X parameter provides flexibility to the system designer, so that the user terminal may be moved, at least initially, to an intermediate symbol rate instead of the absolute maximum symbol rate. This can expedite the login process when perhaps only a small minority of user terminals can close the link at the highest symbol rate in the system.

The gateway (e.g., the MAC/PHY processing subsystem) instructs the user terminal (e.g., via a VS_RL_MAP) to transmit a sequence of $N_{symb\_rate\_det}$ Periodic Management Messages (i.e., PER_MGMT_MSGs). The user terminal compensates the transmit power of the user terminal for the change in symbol rate from $sym\_rate_{min}$ to $sym\_rate_{cur}$. Because these PER_MGMT_MSG bursts will be used for return link power control, the bursts are sent at the same rate as the rate for normal operation (e.g., every 640 ms). In some implementations, the gateway sends a separate PMG for each of the $N_{symb\_rate\_det}$ PER_MGMT_MSGs that the user terminal transmits.

Figure 3:
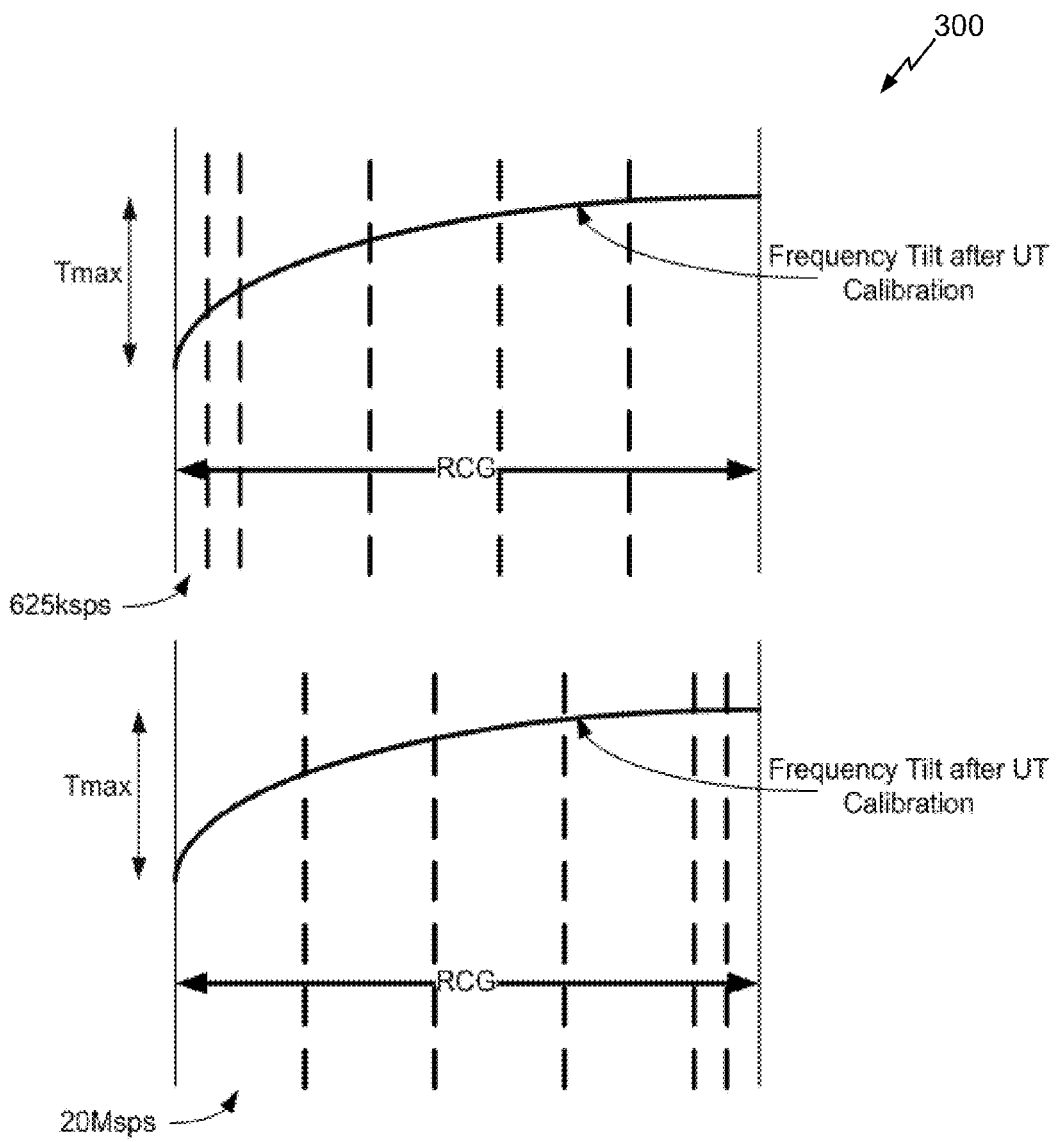
FIG. 3 shows exemplary channel configurations showing a group of return channels of various symbol rates and frequency dependent gain at a user terminal 130 of FIG. 1.

The PER_MGMT_MSG bursts are preferably encoded at the most robust combination of modulation and coding, i.e., modcode, in the system. An example of a robust modcode is Binary Phase-Shift Keying (BPSK) with rate ½ code. Normally, if a transmission occurs at the most robust modcode, the user terminal would lower the transmit power of the user terminal to account for the fact that a burst encoded at the most robust modcode needs less power for quasi error free operation. However, during adaptive maximum symbol rate determination, the user terminal does not lower the transmit power to adjust for the more robust modcode. That is, the user terminal adjusts for the change in symbol rate, according to the power control algorithm, but not for the robust modcode. This is done in order to combat the presence of a significant variation of the user terminal gain between the lowest symbol rate (e.g., 625 ksps) channel where the user terminal started network entry and the higher symbol rate channels to which the user terminal is attempting to move. Exemplary channel configurations 300 showing Return Channel Group (RCGs) of various symbol rates and frequency-dependent gain at a user terminal are shown in FIG. 3. The difference in frequency tilt or frequency response between the 625 ksps channel and the 20 Msps channel is illustrated. A further reason not to adjust the user terminal transmit power based on the robust modcode is that, to ensure that the user terminal SSPA will not saturate, it is preferable for the user terminal to transmit at the nominal power that would be required for the nominal modcode of the spot beam.

Transmission by the user terminal of the $N_{symb\_rate\_det}$ PER_MGMT_MSGs is illustrated in FIG. 4. In some implementations, the adaptive maximum symbol rate determination process appears to the system as a continuation of the initial ranging process. As an example, the gateway (e.g., the MAC/PHY processing subsystem) can intersperse RNG_RSP messages with a Ranging Status parameter set to "continue" at an interval that avoids causing a timeout in the initial ranging protocol.

The gateway (e.g., the MAC/PHY processing subsystem) estimates whether or not the SSPA of the user terminal is saturated by using an NLA technique with these $N_{symb\_rate\_det}$ PER_MGMT_MSGs transmitted from the user terminal. A number of scenarios may occur, as described below.

In one scenario, the $N_{symb\_rate\_det}$ PER_MGMT_MSG bursts are received reliably, and the user terminal is determined to be operating in the linear region of its SSPA. As a result, the rest of the network entry procedures continue with the user terminal at the present symbol rate. This is shown by stages/decisions 502, 504, 506, 508, and 510 of process 500, as described below.

In another scenario, the $N_{symb\_rate\_det}$ PER_MGMT_MSG bursts are received reliably, but the user terminal is determined to be operating in the compression region of its SSPA. That is, the user terminal SSPA is determined to be saturated. The adaptive maximum symbol rate determination protocol repeats at the next lower symbol rate in the Return Channel Group (RCG). This is shown by stages/decisions 502, 504, 506, 508, 512, 514, and 516 of process 500, as described below.

In yet another scenario, there are at least a threshold number of incorrect messages (e.g., $N_{incorrect\_PMM}$) incorrectly received PER_MGMT_MSG bursts. The adaptive maximum symbol rate determination protocol repeats at the same symbol rate (i.e., sym_rate$_{cur}$ unchanged). If, even after a maximum number of instances (e.g., $M_{symb\_rate\_det}$ passes) through this protocol at the same symbol rate, the PER_MGMT_MSG bursts are still not received reliably, then the protocol is repeated at the next lower symbol rate in the RCG. This is shown by stages/decisions 502, 504, 506, 518, 520, 522, 512, 514, and 516 of process 500, as described below.

In still another scenario, none of the $N_{symb\_rate\_det}$ PER_MGMT_MSG bursts are received correctly. The gateway (e.g., the MAC/PHY processing subsystem) moves the user terminal to the next lower symbol rate in the RCG and repeats the adaptive maximum symbol rate determination protocol at the lower sym_rate$_{cur}$. If there are no lower symbol rates to try (e.g., none of the $N_{symb\_rate\_det}$ PER_MGMT_MSG bursts are received correctly even at the lowest symbol rate of sym_rate$_{min}$), then after a maximum number of instances (e.g., $M_{symb\_rate\_det}$ passes) of the protocol at sym_rate$_{cur}$=sym_rate$_{min}$, the gateway assumes that the user terminal has dropped off and the protocol ends. This is shown by stages/decisions 502, 504, 506, 518, 520, 524, 514, 516, and 526 of process 500, as described below.

FIG. 5 provides a flow diagram describing methods of adaptively determining maximum symbol rate of a return link of the satellite communications system 100 of FIG. 1. The process 500 is, however, exemplary only and not limiting. The process 500 can be altered, e.g., by having stages added, removed, or rearranged. The individual stages and decisions mentioned in the scenarios above are described in more detail below.

At stage 502 a counter is set to zero. The counter is used to count instances of $N_{symb\_rate\_det}$ PER_MGMT_MSG transmissions by the user terminal at a constant symbol rate (i.e., sym_rate$_{cur}$ unchanged).

At stage 504, the user terminal transmits the $N_{symb\_rate\_det}$ PER_MGMT_MSG bursts as instructed by the gateway. At decision 506, a processor (e.g., a processor at the gateway) determines if the PER_MGMT_MSG bursts are reliably received by checking if the number of PER_MGMT_MSG bursts received incorrectly is less than $N_{incorrect\_PMM}$. If fewer than $N_{incorrect\_PMM}$ PER_MGMT_MSG bursts are received incorrectly (i.e., "Yes" branch of decision 506), the process 500 continues to decision 508. If $N_{incorrect\_PMM}$ or more PER_MGMT_MSG bursts are received incorrectly (i.e., "No" branch of decision 506), the process 500 continues to stage 518.

At decision 508, the processor determines if the user terminal SSPA is saturated. If the user terminal SSPA is determined not to be saturated (i.e., "No" branch of decision 508), network entry procedures continue at the current symbol rate, sym_rate$_{cnr}$, at stage 510. If the user terminal SSPA is determined to be saturated (i.e., "Yes" branch of decision 508), the process 500 continues to decision 512.

At decision 512, the processor determines if the current symbol rate is equal to the lowest symbol rate, i.e., whether sym_rate$_{cur}$=sym_rate$_{min}$. If the current symbol rate is determined to be equal to the lowest symbol rate (i.e., "Yes" branch of decision 512), the process 500 ends. If the current symbol rate is determined not to be equal to the lowest symbol rate (i.e., "No" branch of decision 512), the process 500 continues to stage 514.

At stage 514, the processor notifies the user terminal that the user terminal should transmit at the next lower symbol rate of the RCG. The process 500 then continues to stage 516, where the counter is cleared. This allows the process 500 to repeat at this lower current symbol rate to see if the user terminal can reliably receive at this symbol rate without sending the SSPA into saturation.

Returning to decision 506, if $N_{incorrect\_PMM}$ or more PER_MGMT_MSG bursts are received incorrectly (i.e., "No" branch of decision 506), the process 500 continues to stage 518, where the counter is incremented. This allows the process 500 to repeat at the current symbol rate for a number of instances, or passes, to see if the user terminal can reliably receive at this symbol rate without sending the SSPA into saturation.

At decision 520, the processor determines if all the $N_{symb\_rate\_det}$ PER_MGMT_MSG bursts are received incorrectly. If the processor determines that not all the $N_{symb\_rate\_det}$ PER_MGMT_MSG bursts are received incorrectly (i.e., "No" branch of decision 520), the process 500 continues to decision 522. If the processor determines that all the $N_{symb\_rate\_det}$ PER_MGMT_MSG bursts are received incorrectly (i.e., "Yes" branch of decision 520), the process 500 continues to decision 524.

At decision 522, the processor determines if the counter equals $M_{symb\_rate\_det}$, which is a check to see if the protocol has repeated at the current symbol rate for the maximum number of instances (i.e., $M_{symb\_rate\_det}$ passes) without reliable reception of the PER_MGMT_MSG bursts. If the counter does not equal $M_{symb\_rate\_det}$ "No" branch of decision 522), the process 500 returns to stage 504 for the user terminal to send another $N_{symb\_rate\_det}$ PER_MGMT_MSG bursts at the current symbol rate. If the counter does equal $M_{symb\_rate\_det}$ (i.e., "Yes" branch of decision 522), the process 500 continues to decision 512 to determine if the current symbol rate is equal to the lowest symbol rate, i.e., whether $sym\_rate_{cur} = sym\_rate_{min}$. If the current symbol rate is equal to the lowest symbol rate, the process 500 ends. Otherwise, the current symbol rate is lowered and the process 500 repeats after the counter is cleared.

At decision 524, the processor determines if current symbol rate is equal to the lowest symbol rate, i.e., whether $sym\_rate_{cur} = sym\_rate_{min}$. If the current symbol rate is determined to be equal to the lowest symbol rate (i.e., "Yes" branch of decision 524), the process 500 continues to decision 526. If the current symbol rate is determined not to be equal to the lowest symbol rate (i.e., "No" branch of decision 524), the process 500 continues to stage 514. The processor then notifies the user terminal that the user terminal should transmit at the next lower symbol rate of the RCG, and the counter is cleared before the process 500 repeats at this lower current symbol rate.

At decision 526, the processor determines if the counter equals $M_{symb\_rate\_det}$. If the counter does not equal $M_{symb\_rate\_det}$ "No" branch of decision 526), the process 500 returns to stage 504 for the user terminal to send another $N_{symb\_rate\_det}$ PER_MGMT_MSG bursts at the current symbol rate (i.e., $sym\_rate_{cur} = sym\_rate_{min}$). If the counter does equal $M_{symb\_rate\_det}$ (i.e., "Yes" branch of decision 526), meaning that the PER_MGMT_MSG bursts were not received reliably for $M_{symb\_rate\_det}$ passes, the gateway assumes that the user terminal has dropped off and the process 500 ends.

Presuming that the adaptive maximum symbol rate determination protocol ends with $N_{symb\_rate\_det}$ PER_MGMT_MSG bursts reliably received at a current symbol rate (i.e., $sym\_rate_{cur}$) while the user terminal SSPA operates in the linear region, the home channel assignment begins. This is illustrated in FIG. 4. In particular, the gateway (e.g., the MAC/PHY processing subsystem) selects a channel in the RCG of the current symbol rate (i.e., $sym\_rate_{cur}$) to assign to the user terminal as its home channel. The gateway sends the home channel assignment to the user terminal by including the Home_Channel_Assignment_IE identifier in a VS_RL_MAP message used to allocate a PMG to the user terminal. The gateway interprets successful reception of a VS_CINR signaling header in a PER_MGMT_MSG burst sent by the user terminal in response to the PMG as indication that the user terminal received the home channel assignment. If the gateway does not receive a VS_CINR signaling header in a PER_MGMT_MSG burst sent by the user terminal in response to the PMG, the gateway will retry the home channel assignment after a timeout of duration $T_{HOMECHAN\_ASSIGN}$.

There are numerous variants to the adaptive maximum symbol rate determination process described above. For example, instead of the gateway determining whether the user terminal SSPA has entered the compression region, the user terminal can make this determination and notify the gateway of the determination via a message.

In another example, instead of the user terminal having transmission opportunities assigned by the gateway for transmitting PER_MGMT_MSG bursts, the user terminal can transmit the PER_MGMT_MSG bursts via contention access, where the user terminal might potentially collide with other user terminals. With contention access, the user terminal randomly selects a contention timeslot, frequency, etc. each time the user terminal attempts a connection in order to lower the probability of collision.

In the contention access example, each return link channel has a contention region. A user terminal autonomously chooses a contention region associated with a return link channel and begins to transmit burst packets. If there were no collisions, the burst packets would be received at the gateway, which can make NLA determinations on the received burst packets. If there were collisions, some of the burst packets could be in error, and adaptive maximum symbol rate determination can occur similar to the techniques described above.

In particular, the user terminal can send, via contention access, N burst packets for a particular symbol rate, where the gateway correctly receives M of the N burst packets. If M=N, all the burst packets were correctly received, and the gateway either assigns the home channel (e.g., as described above) or notifies the user terminal that it has entered the saturation region of the SSPA and needs to repeat the process at a lower symbol rate. If 0<M<N, the gateway determines that some of the burst packets are in error and notifies the user terminal, via a forward link message, to repeat the process (e.g., at the same symbol rate) via contention access or assigned transmission opportunities. If M=0, the gateway is not aware that the user terminal attempted the connection, because zero burst packets were correctly received. In this scenario, if the user terminal does not receive any messaging from the gateway (e.g., no home channel assignment message, no re-try message, etc.), the user terminal can, after some time, repeat the process at the same symbol rate. If the user terminal repeats the process at the same symbol rate a threshold number of times without success, the user terminal can attempt the process at a lower symbol rate.

Process of Determining a Maximum Symbol Rate of a Return Communication Link

Figure 6:
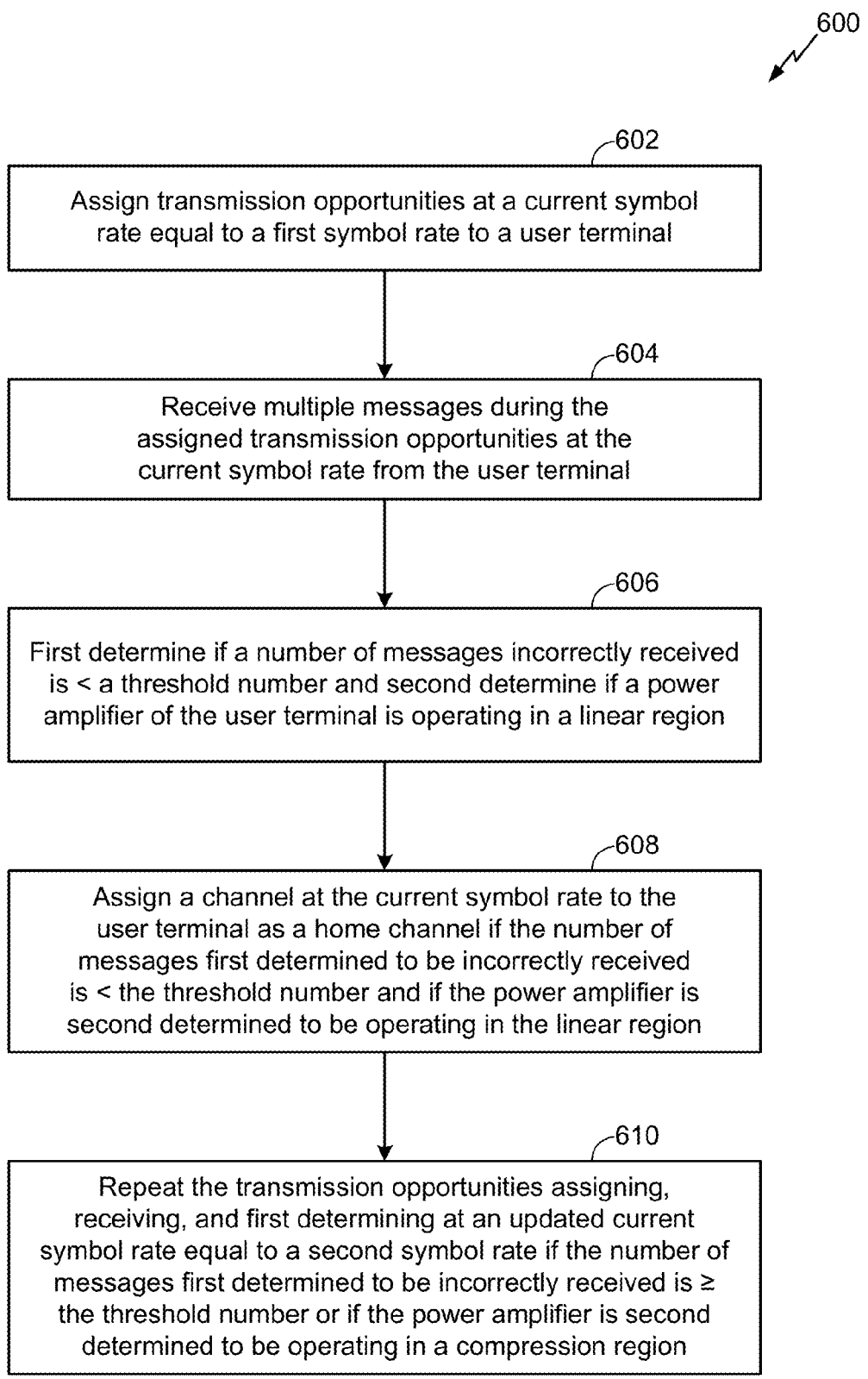
FIG. 6 provides a flow diagram describing methods for determining a maximum symbol rate of a return communication link from a user terminal to a satellite.

FIG. 6 provides a flow diagram describing methods for determining a maximum symbol rate of a return communication link from a user terminal to a satellite. The process 600 is, however, exemplary only and not limiting. The process 600 can be altered, e.g., by having stages added, removed, or rearranged.

At stage 602, a processor (e.g., a processor of the gateway terminal 115 of FIG. 1) assigns transmission opportunities at a current symbol rate to the user terminal, where the current symbol rate is equal to a first symbol rate. For example, the first symbol rate can be equal to the minimum of X Msps and sym_rate$_{max}$, where X is a parameter set by the system. Examples of transmission opportunities include one or more of timeslots, frequencies, and codes.

At stage 604, the processor receives multiple messages during the assigned transmission opportunities at the current symbol rate from the user terminal. For example, the gateway can receive N$_{symb\_rate\_det}$ PER_MGMT_MSG bursts from the user terminal.

At stage 606, the processor first determines if a number of the multiple messages incorrectly received is less than a threshold number of incorrect messages and second determines if a power amplifier of the user terminal is operating in a linear region. For example, the MAC/PHY processing subsystem of the gateway can first determine if the number of PER_MGMT_MSG bursts incorrectly received is less than N$_{incorrect\_PMM}$ and second determine if the user terminal SSPA is operating in its linear region.

At stage 608, the processor assigns a channel at the current symbol rate (i.e., sym_rate$_{cur}$) to the user terminal as a home channel for the user terminal if the number of the multiple messages first determined to be incorrectly received is less than the threshold number of incorrect messages and if the power amplifier is second determined to be operating in the linear region. This is shown, for example, at stage 510 of process 500 of FIG. 5.

At stage 610, the processor repeats the transmission opportunities assigning of stage 602, the receiving of stage 604, and the first determining of stage 606 at an updated current symbol rate equal to a second symbol rate if the number of the multiple messages first determined to be incorrectly received is greater than or equal to the threshold number of incorrect messages or if the power amplifier is second determined to be operating in a compression region. The second symbol rate can be equal to or lower than the first symbol rate. This is shown, for example, at stage 514 of process 500 of FIG. 5.

In some implementations, after stage 610, the processor repeats the transmission opportunities assigning of stage 602, the receiving of stage 604, and the first determining of stage 606 at an updated current symbol rate equal to a third symbol rate that is higher than the second symbol rate. For example, to account for the scenario where the user terminal cannot close the link at the highest symbol rate because the user terminal was experiencing a fade event, the system can periodically test whether the user terminal can be moved to a higher symbol rate or the highest symbol rate, i.e., the third symbol rate.

It should be noted that the methods and systems discussed throughout the specification are provided merely as examples. Various embodiments may omit, substitute, or add various procedures or components as appropriate. For instance, it should be appreciated that features described with respect to certain embodiments may be combined in various other embodiments. Also, measurements can be made and the various values provided in any units. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

Having described several embodiments, it will be recognized by those of skill in the art that various modifications, alternative constructions, and equivalents may be used without departing from the spirit of the invention. For example, the above elements may be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for determining a maximum symbol rate of a return communication link from a user terminal to a satellite, the method comprising:

assigning transmission opportunities at a current symbol rate to the user terminal, the current symbol rate equal to a first symbol rate;

receiving a plurality of messages during the assigned transmission opportunities at the current symbol rate from the user terminal;

first determining if a number of the plurality of messages incorrectly received is less than a threshold number of incorrect messages and second determining if a power amplifier of the user terminal is operating in a linear region;

if the number of the plurality of messages first determined to be incorrectly received is less than the threshold number of incorrect messages and if the power amplifier is second determined to be operating in the linear region, assigning a channel at the current symbol rate to the user terminal as a home channel for the user terminal;

if the power amplifier is second determined to be operating in a compression region, repeating the transmission opportunities assigning, receiving, and first determining at the current symbol rate equal to a second symbol rate; and if the number of the plurality of messages first determined to be incorrectly received is greater than or equal to the threshold number of incorrect messages and if not all messages of the plurality of messages are third determined to be incorrectly received, repeating the receiving and first determining at the current symbol rate until a number of a latest plurality of messages first determined to be incorrectly received is less than the threshold number of incorrect messages or a number of instances of the receiving and first determining at the current symbol rate is fourth determined to be equal to a maximum number of instances.

2. The method of claim 1, wherein the first symbol rate is equal to a maximum symbol rate for the return communication link.

3. The method of claim 1, wherein the first symbol rate is equal to an intermediate symbol rate that is lower than a maximum symbol rate for the return communication link.

4. The method of claim 1, further comprising:

if the number of the plurality of messages first determined to be incorrectly received is greater than or equal to the threshold number of incorrect messages and if all messages of the plurality of messages are third determined to be incorrectly received, fourth determining if the current symbol rate is equal to a minimum symbol rate for the return communication link;

if the current symbol rate is fourth determined to be equal to the minimum symbol rate, repeating the receiving and first determining at the current symbol rate until a number of a latest plurality of messages first determined to be incorrectly received is less than the threshold number of incorrect messages or a number of instances of the receiving and first determining at the current symbol rate is fifth determined to be equal to a maximum number of instances; and if the current symbol rate is fourth determined to be unequal to the minimum symbol rate, repeating the transmission opportunities assigning, receiving, and first determining at the current symbol rate equal to the second symbol rate that is lower than the first symbol rate.

5. The method of claim 1, wherein repeating comprises repeating the transmission opportunities assigning, receiving, and determining at updated current symbol rates that are increasingly lower for each consecutive iteration.

6. The method of claim 5, wherein repeating comprises:
repeating until both a number of the plurality of messages of a latest iteration first determined to be incorrectly received is less than the threshold number of incorrect messages and the power amplifier is second determined to be operating in the linear region for the updated current symbol rate of the latest iteration; and
assigning a channel at the updated current symbol rate of the latest iteration to the user terminal as a home channel for the user terminal.

7. The method of claim 5, wherein repeating comprises repeating until the power amplifier is second determined to be operating in the compression region for the latest iteration and the updated current symbol rate of the latest iteration is third determined to be equal to a minimum symbol rate for the return communication link.

8. The method of claim 1, further comprising repeating the transmission opportunities assigning, receiving, and first determining at an updated current symbol rate equal to a third symbol rate that is higher than the second symbol rate.

9. A system for determining a maximum symbol rate of a return communication link in a satellite communications system, the system comprising:
a plurality of user terminals;
a satellite communicatively coupled to the plurality of user terminals; and
a gateway communicatively coupled to the satellite and configured to:
assign transmission opportunities at a current symbol rate to a user terminal of the plurality of user terminals, the current symbol rate equal to a first symbol rate;
receive a plurality of messages during the assigned transmission opportunities at the current symbol rate from the user terminal;
first determine if a number of the plurality of messages incorrectly received is less than a threshold number of incorrect messages and second determine if a power amplifier of the user terminal is operating in a linear region;
if the number of the plurality of messages first determined to be incorrectly received is less than the threshold number of incorrect messages and if the power amplifier is second determined to be operating in the linear region, assign a channel at the current symbol rate to the user terminal as a home channel for the user terminal;
the power amplifier is second determined to be operating in a compression region, repeat the transmission opportunities assigning, receiving, and first determining at an updated the current symbol rate equal to a second symbol rate; and if the number of the plurality of messages first determined to be incorrectly received is greater than or equal to the threshold number of incorrect messages and if not all messages of the plurality of messages are third determined to be incorrectly received, repeat the receiving and first determining at the current symbol rate until a number of a latest plurality of messages first determined to be incorrectly received is less than the threshold number of incorrect messages or a number of instances of the receiving and first determining at the current symbol rate is fourth determined to be equal to a maximum number of instances.

10. The system of claim 9, wherein the first symbol rate is equal to a maximum symbol rate for the return communication link.

11. The system of claim 9, wherein the first symbol rate is equal to an intermediate symbol rate that is lower than a maximum symbol rate for the return communication link.

12. The system of claim 9, wherein the gateway is further configured to:
if the number of the plurality of messages first determined to be incorrectly received is greater than or equal to the threshold number of incorrect messages and if all messages of the plurality of messages are third determined to be incorrectly received, fourth determine if the current symbol rate is equal to a minimum symbol rate for the return communication link;
if the current symbol rate is fourth determined to be equal to the minimum symbol rate, repeat the receiving and first determining at the current symbol rate until a number of a latest plurality of messages first determined to be incorrectly received is less than the threshold number of incorrect messages or a number of instances of the receiving and first determining at the current symbol rate is fifth determined to be equal to a maximum number of instances; and
if the current symbol rate is fourth determined to be unequal to the minimum symbol rate, repeat the transmission opportunities assigning, receiving, and first determining at the updated current symbol rate equal to the second symbol rate that is lower than the first symbol rate.

13. The system of claim 9, wherein the gateway is further configured to repeat the transmission opportunities assigning, receiving, and determining at updated current symbol rates that are increasingly lower for each consecutive iteration.

14. The system of claim 13, wherein the gateway is further configured to:
repeat the transmission opportunities assigning, receiving, and determining until both a number of the plurality of messages of a latest iteration first determined to be incorrectly received is less than the threshold number of incorrect messages and the power amplifier is second determined to be operating in the linear region for the updated current symbol rate of the latest iteration; and
assign a channel at the updated current symbol rate of the latest iteration to the user terminal as a home channel for the user terminal.

15. The system of claim 13, wherein the gateway is further configured to repeat the transmission opportunities assigning, receiving, and determining until the power amplifier is second determined to be operating in the compression region for the latest iteration and the updated current symbol rate of the latest iteration is third determined to be equal to a minimum symbol rate for the return communication link.

16. The system of claim 9, wherein the gateway is further configured to repeat the transmission opportunities assigning, receiving, and first determining at an updated current symbol rate equal to a third symbol rate that is higher than the second symbol rate.

* * * * *